US011858289B2

(12) United States Patent
Hori

(10) Patent No.: US 11,858,289 B2
(45) Date of Patent: Jan. 2, 2024

(54) APPLICATOR

(71) Applicant: 3S CORPORATION, Saitama (JP)

(72) Inventor: Eiji Hori, Saitama (JP)

(73) Assignee: 3S CORPORATION, Saitama (JP)

( * ) Notice: Subject to any disclaimer, the term of this patent is extended or adjusted under 35 U.S.C. 154(b) by 205 days.

(21) Appl. No.: 17/474,000

(22) Filed: Sep. 13, 2021

(65) Prior Publication Data

US 2021/0402824 A1 Dec. 30, 2021

Related U.S. Application Data

(63) Continuation of application No. PCT/JP2020/010300, filed on Mar. 10, 2020.

(30) Foreign Application Priority Data

Mar. 14, 2019 (JP) ................................ 2019-047162

(51) Int. Cl.
*B43K 8/04* (2006.01)
*A45D 34/04* (2006.01)
*B43K 8/03* (2006.01)

(52) U.S. Cl.
CPC ................ *B43K 8/04* (2013.01); *A45D 34/04* (2013.01); *B43K 8/03* (2013.01); *A45D 2200/10* (2013.01)

(58) Field of Classification Search
CPC ....... B43K 8/12; B43K 5/1836; B43K 5/1845
See application file for complete search history.

(56) References Cited

U.S. PATENT DOCUMENTS 5,967,688 A 10/1999 Hu
11,370,243 B2 * 6/2022 Hori ........................ B43K 8/06
2005/0249542 A1 11/2005 Hori
(Continued)

FOREIGN PATENT DOCUMENTS

JP S60134672 U 9/1985
JP S637579 U 1/1988
JP H6305286 A 11/1994
(Continued)

OTHER PUBLICATIONS

Extended European Search Report in EP Application No. 20769051.2 dated Oct. 17, 2022, 8pp.
(Continued)

*Primary Examiner* — Jennifer C Chiang
(74) *Attorney, Agent, or Firm* — HAUPTMAN HAM, LLP

(57) ABSTRACT

An applicator includes a main body, a storage chamber disposed in the main body, an application body disposed at an end of the main body to allow application of the liquid stored in the storage chamber. A partition for partitioning between the storage chamber side and the application body side, includes a flow passage to supply the liquid in the storage chamber to the application body. An axially movable air communication pipe having an air port open to the storage chamber, which abuts on the partition to close the flow passage, communicates the storage chamber with the atmosphere while having the flow passage closed. A spring member for urging the air communication pipe to abut on the partition, and separating the air communication pipe from the partition through vibration of the main body allows guiding of the liquid in the storage chamber.

20 Claims, 12 Drawing Sheets

(56) References Cited

U.S. PATENT DOCUMENTS

| | | | |
|---|---|---|---|
| 2008/0063463 | A1 | 3/2008 | Hori |
| 2017/0282633 | A1 | 10/2017 | Debartolo, Jr. et al. |

FOREIGN PATENT DOCUMENTS

| | | | | |
|---|---|---|---|---|
| JP | 200656051 | A | 3/2006 | |
| JP | 2006187892 | A | 7/2006 | |
| KR | 1020090084987 | A | 8/2009 | |
| WO | 2004000575 | A1 | 12/2003 | |
| WO | 2005123416 | A1 | 12/2005 | |
| WO | WO-2006122693 | A2 * | 11/2006 | ............. B43K 1/086 |

OTHER PUBLICATIONS

International Search Report in PCT Application No. PCT/JP2020/010300, dated Jun. 16, 2020, 4pp.

Office Action in JP Application No. 2020-536824, dated Feb. 18, 2021, 11pp.

* cited by examiner

AA CROSS SECTION

BB CROSS SECTION

APPLICATOR

RELATED APPLICATIONS

The present application is a continuation of International Application No. PCT/JP2020/010300, filed Mar. 10, 2020, which claims priority from Japanese Patent Application No. 2019-047162, filed Mar. 14, 2019 the disclosures of which applications are hereby incorporated by reference here in their entirety.

TECHNICAL FIELD

The present invention relates to an applicator applied to a writing tool such as a felt-tip pen and a marking pen, a cosmetic tool such as an eyeliner, a stamp, a medication application container, and the like. The applicator is configured to allow storage and application of various kinds of liquid in the raw such as ink, skin lotion, perfume, and medicine.

BACKGROUND ART

There has been a known applicator configured to store the liquid such as the ink and the skin lotion while being kept in the raw for application at appropriate timing instead of being kept occluded in an occluding body such as an inner cotton. For example, the raw-ink type applicator (writing tool) is disclosed in patent literature 1. The disclosed writing tool has a through hole formed in the partition for partitioning between the reservoir chamber and the ink storage chamber so that the relay core is inserted into the through hole to penetrate the partition. The predetermined gap is formed between the inner wall of the through hole and the relay core, in which the ink is held under capillary force to cause the gas-liquid exchange.

The ink stored in the ink storage chamber is subjected to the gas-liquid exchange at the gap between the inner wall of the through hole and the relay core (air inflow is allowed to the inside of the ink storage chamber) so that the ink is consumed (for writing) at the application body side. In this case, as the ink is consumed, air will flow into the ink storage chamber via the gap by the volume equivalent to the ink consumption amount. When the internal pressure of the ink storage chamber is raised by the temperature change, the ink is likely to be pushed out to the inside of the reservoir chamber via the through hole. Especially in the case of temperature rise, the air expansion volume is reflected directly in the pushed-out quantity of the ink. Accordingly, the ink is likely to be pushed out to cause outflow of a large quantity of the ink to the reservoir chamber. The outflow of a large quantity of the ink to the reservoir chamber brings the application body side into the ink-rich state. As a result, there may cause a large dot stain (ink leakage) while writing. Although Patent literature 1 discloses that the occluding body for occluding the pushed-out ink is disposed in the reservoir chamber, it is preferable to minimize the ink pushed out to the inside of the reservoir chamber.

Patent Literature 2 discloses the structure for limiting quantity of the ink flowing from the ink storage chamber to the gas-liquid exchange region to prevent outflow of the large quantity of ink to the inside of the reservoir chamber. Specifically, the partition extension part extending to the ink storage chamber side is formed to directly insert the relay core through the partition having the through hole. The ink can be held under capillary force in the gap between the inner surface of the partition extension part and the outer circumferential surface of the relay core along the axial direction. In the structure as described above, the ink in a region of the partition extension part is only pushed out even when the temperature changes. This makes it possible to suppress leakage of a large quantity of ink to the reservoir chamber, and the application body side from being brought into the ink-rich state.

CITATION LIST

Patent Literature

Patent Literature 1: WO2004/000575
Patent Literature 2: WO2005/123416

SUMMARY OF INVENTION

Problem to be Solved by the Invention

Generally, in the case of direct liquid type applicator, the storage chamber for ink storage has an air inlet opened therein to allow air inflow. The air inlet allows inflow of air by the volume equivalent to consumption quantity of the ink stored in the storage chamber. For example, as the above-described patent literature discloses, the air inlet can be constituted by the through hole that allows insertion of the relay core through the partition for separating the storage chamber from the reservoir chamber while leaving a predetermined gap.

In the structure having the gap for gas-liquid exchange around the relay core to be inserted into the through hole formed in the partition, the gas-liquid exchange sensitivity is deteriorated because of the liquid held in the gap. This may prevent smooth writing with ink at the application body side. In other words, as the air inflow is allowed simultaneously with the use of ink held in the gap, the air inflow resistance is increased. Consequently, the use of high-viscous ink hinders smooth inflow of air into the storage chamber. There is a possibility of insufficient discharge of ink from the application body.

In this case, an additional air inlet for communication with the atmosphere may be formed in the storage chamber so that outflow of the ink can be smoothly done. In the structure, as the internal pressure of the storage chamber increases, the ink directly flows into the application body to be brought into the ink-rich state. In the structure where the gas-liquid exchange is performed by inserting the relay core through the gap of the through hole in the partition, the ink stored in the storage chamber and the one held in the through hole of the partition are communicated with each other. If the ink held in the through hole outflows to the application body side under the increasing internal pressure in the storage chamber, the ink in the storage chamber also flows directly to the application body side. This easily brings the application body side into the ink-rich state. It is difficult for generally employed raw-ink type applicator to control ink supply to the application body side.

An object of the present invention is to provide an applicator configured to control the liquid supplied from the storage chamber to the application body side to secure smooth application operations.

Means for Solving Problem

In order to attain the above-described object, the applicator according to the present invention includes a main body, a storage chamber disposed in the main body for storing a liquid, an application body disposed at an end of the main body to allow application of the liquid stored in the storage chamber, a partition for partitioning between the storage chamber side and the application body side, the partition including a flow passage to supply the liquid in the storage chamber to the application body, an axially movable air communication pipe having an air port open to the storage chamber, the axially movable air communication pipe abutting on the partition to close the flow passage and communicating the storage chamber with the atmosphere while having the flow passage closed, and an urging unit for urging the air communication pipe to abut on the partition, and separating the air communication pipe from the partition through vibration of the main body to allow guiding of the liquid in the storage chamber to the flow passage.

The above-structured applicator has a flow passage in the partition which separates the storage chamber side for storing the liquid from the application body side so that the liquid outflows toward the application body side. Normally, the flow passage is closed by an air communication pipe urged by an urging unit. As the liquid does not outflow to the application body side, the application body is not brought into the liquid-rich state.

When applying the liquid, the above-described structure allows the liquid to be directly applied so long as the liquid is contained in the application body. If the liquid is not sufficiently held by the application body, the main body is vibrated (shaken) so that the air communication pipe is separated from the partition. The storage chamber is communicated with the atmosphere via an air port of the air communication pipe. If the air communication pipe is separated from the partition, the liquid flows into the flow passage of the partition immediately, and moves to the application body without being influenced by the temperature rise, change in the atmospheric pressure, or the like. In such a case, the inner state of the storage chamber is the same as the atmospheric pressure state via the air port of the air communication pipe. Accordingly, even in the case of the high-viscous liquid, the liquid outflow state can be stabilized. The air communication pipe is urged against the partition side by the urging unit. When shaking of the main body is stopped, the air communication pipe closes the flow passage to prevent outflow of the liquid.

As described above, the storage chamber is communicated with the atmosphere via the air port of the air communication pipe. Accordingly, there is no transfer resistance between the liquid and air upon gas-liquid exchange, resulting in improved liquid outflow response. When the air communication pipe is separated from the partition against the urging force, the liquid is immediately supplied to the application body via the flow passage without requiring shaking of the main body many times. This allows the application body side to perform smooth liquid application.

Effect of the Invention

The present invention provides the applicator capable of suppressing outflow of the liquid from the storage chamber to the application body side, and improving the gas-liquid exchange sensitivity to secure smooth application.

BRIEF DESCRIPTION OF DRAWINGS

FIG. 1 shows an applicator according to a first embodiment of the present invention, specifically.

FIG. 11 shows the applicator according to a tenth embodiment of the present invention, specifically.

FIG. 12 shows a modified example of the first embodiment, specifically.

MODE(S) FOR CARRYING OUT THE INVENTION

Figure 1A:
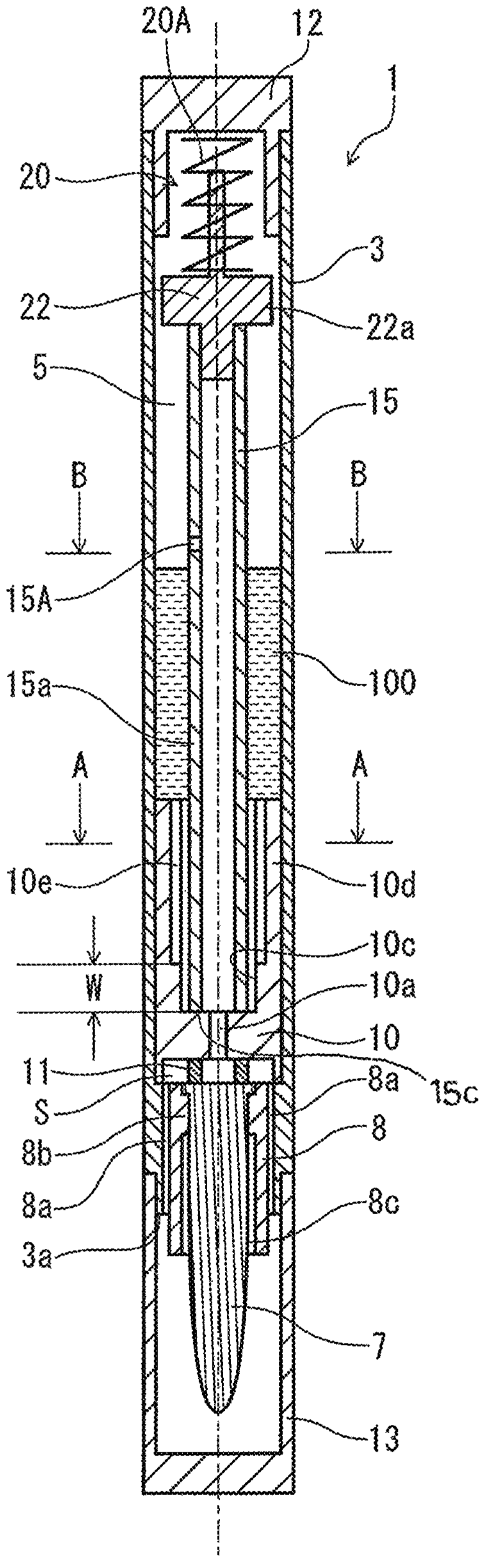
FIG. 1A is a longitudinal sectional view.

Embodiments of an applicator according to the present invention will be described referring to the drawings. The applicator to be described in the following embodiments is formed as a cosmetic article applied to the eyeliner.

Figure 1B:
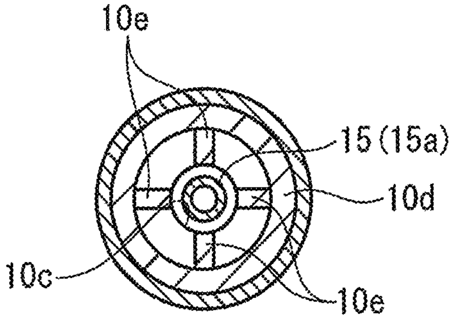
FIG. 1B is a sectional view taken along line A-A of FIG. 1A.
Figure 1C:
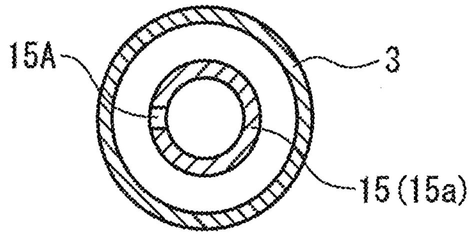
FIG. 1C is a sectional view taken along line B-B of FIG. 1A.

FIG. 1 shows the applicator of a first embodiment, specifically, FIG. 1A is a longitudinal sectional view, FIG. 1B is a sectional view taken along line A-A of FIG. 1A, and FIG. 1C is a sectional view taken along line B-B of FIG. 1A. An applicator 1 of the embodiment includes a cylindrical shaft (main body) 3 having a cavity. The main body 3 includes a storage chamber 5 for storing a liquid 100, and an application body (brush) 7 for applying the liquid 100, which are formed therein. The main body 3 is divided into the storage chamber 5 side and the application body 7 side by a partition 10 press fitted and fixed to the inside of the main body 3.

The main body 3 may be formed to have a circular cross section, or a non-circular (polygonal and the like) cross section. The application body 7 is held by a holder 8 which is press fitted to the leading end side of the main body 3, and integrated therewith. The application body 7 has its leading end side protruding from a leading edge 3*a* of the main body 3, and its proximal side facing the partition 10. In the embodiment, the proximal side of the application body 7 faces the partition 10 while having a rib 11 integrated with the holder 8 or the partition 10 intervening therebetween. The application body 7 is held with the rib 11 while having a gap S formed between the application body and the partition 10. In this case, the application body 7 may be held in direct contact with the partition 10. In other words, the application body 7 may be structured to be in contact (tight contact) with the partition 10 for sealing. Alternatively, the application body 7 and the partition 10 may be formed to be in partial contact with each other.

The partition 10 has a through hole (constituting the flow passage) 10*a* in its center part. Preferably, the application body 7 has its axial core aligned (may be substantially aligned) with the axial center of the flow passage 10*a*. The rib 11 is formed around a circumference of the flow passage 10*a* so as to be communicated with an air passage 8*a* as described below. For example, the rib 11 may be annularly formed to enclose the flow passage 10*a*, and has a notch partially formed to communicate the gap S with the flow passage 10*a*. In this way, the shape and arrangement of the rib 11 are not limited so long as the air inflow to the inside of the flow passage 10*a* is allowed. Even in the case where the application body 7 and the partition 10 are in tight contact with each other (including partial tight contact), air can be securely ventilated.

The air passage 8*a* may be arbitrarily formed so long as it is structured to allow inflow of the atmosphere to the flow passage 10*a* (gap S). In this embodiment, the air passage is formed around an outer circumference of the holder 8. The air passage 8*a* may be formed into an arbitrary shape and arrangement so long as communication with the atmosphere is allowed by forming the air passages 8*a* at multiple positions (in the structure of FIG. 1, they are formed at two positions on the outer circumference of the holder 8 at an angular interval of approximately 180°), forming those passages into an arc-like arrangement on the outer circumference of the holder 8, or the like.

As FIG. 1 shows, the holder 8 has a small-diameter portion 8*b* to which the application body 7 is fixed so that an annular gap 8*c* between the application body 7 and the inner surface of the holder 8 serves as the air passage.

A cap 13 for protecting the application body 7 protruding from the leading edge 3*a* is detachably attached to the leading end side of the main body 3. A cap-like tail plug 12 is press fitted and fixed to the rear end side.

The cap 13 may be detachably attached to the main body 3, or to the holder 8 for holding the application body 7. In the embodiment, it is detachably attached to the main body 3. Upon attachment of the cap 13 to the main body 3, the air passage 8*a* is brought into the closed state.

The tail plug 12 may be press fitted and fixed to a rear end opening of the main body 3 or detachably attached. The tail plug performs the sealing function by filling the main body 3 with the liquid 100 from the rear end opening. If the liquid is filled from the leading end side, the tail plug 12 does not have to be provided.

An air communication pipe 15 in abutment on the partition 10 for closing the flow passage 10*a* is disposed in the storage chamber 5. The air communication pipe 15 extends axially in the storage chamber 5 while being urged against the partition 10 constantly by an urging unit to be described later. A circumferential wall 15*a* of the air communication pipe 15 has its internal diameter made larger than a diameter of the flow passage 10*a*. Upon abutment of the air communication pipe 15 on the partition 10, the flow passage 10*a* is closed by the circumferential wall 15*a*.

An arbitrary process may be implemented for closing the flow passage 10*a* so long as the closing operation is performed using the displaceable air communication pipe 15. For example, the closing operation may be performed by fitting the outer circumferential surface of the circumferential wall 15*a* of the air communication pipe 15 with the inner circumferential surface of a recess part 10*c* of the partition 10, which will be described later (fitting to the degree that hardly disturbs displacement of the air communication pipe 15). Alternatively, the flow passage 10*a* may be closed through abutment of a leading edge 15*c* of the air communication pipe 15 on the partition 10, or the use of the circumferential wall 15*a* or/and the leading edge 15*c*.

The cross section of the air communication pipe 15 may be formed into the polygonal shape besides the circular shape in no restrictive manner. It may also be formed to have a partially solid part. For example, the part at the rear end side may be solid to impart the weight-added part. The structure of the air communication pipe 15 (thickness, length, material, or the like) may be appropriately determined in accordance with property of the liquid to be filled (viscosity, usage, or the like).

The air communication pipe 15 may be arbitrarily formed so long as it performs the function for communication of the storage chamber 5 that closes the flow passage 10*a* with the atmosphere via the air passage 8*a*. In the embodiment, the air communication pipe 15 is structured to allow communication with the atmosphere via the flow passage 10*a* formed in the center part of the partition 10. For this reason, the air communication pipe 15 has an air port open to the storage chamber. The air port of the embodiment is formed as a through hole (opening) 15A formed in the circumferential wall 15*a* of the air communication pipe 15 at the tail plug side (hereinafter referred to as air port 15A).

The air communication pipe 15 may be structured to communicate with the atmosphere through the passage other than the flow passage 10*a* such as by forming an air hole other than the flow passage in the partition.

The air communication pipe 15 is urged by an urging unit 20 so that the leading edge 15*c* is brought into abutment on the partition 10. The urging unit 20 of the embodiment is formed as a spring member 20A that intervenes between the main body (tail plug) and the air communication pipe. In this case, the spring member 20A is formed as a coil spring, and held by abutting one end on the inner surface of the tail plug 12, and the other end on a stirring member 22 to be press fitted to the air communication pipe 15.

The stirring member 22 performs the function of stirring the liquid 100 stored in the storage chamber 5 when vibrating (shaking) the main body 3, and includes a protrusion 22*a* that protrudes radially with respect to the air communication pipe 15. The stirring member 22 may be structured to serve as a specific weight (mass) so that the spring member 20A is easily compressed upon shaking of the main body 3.

The urging unit 20 may be arbitrarily structured to perform a function for constantly abutting the air communication pipe 15 on the partition 10 to close the flow passage 10*a*, and to separate the air communication pipe 15 from the partition 10 upon shaking of the main body 3 to guide the liquid in the storage chamber to the flow passage 10*a* via the outer circumferential surface of the air communication pipe 15. In other words, the urging unit is not limited to the coil spring disposed between the above-described main body 3 (tail plug 12) and the air communication pipe 15. For example, it may be constituted by the disc spring, or the tension spring without being limited to the arrangement position. It may be formed by adding a specific load applied to the air communication pipe 15 so that the urging unit abuts on the partition 10 by its own weight.

The air communication pipe 15 is axially displaceable in the storage chamber 5 so that the flow passage 10*a* is closed with the circumferential wall 15*a*. Preferably, the air communication pipe 15 is disposed in the storage chamber while being in a radially restricted state for securing the stable closed state.

In the embodiment, the partition 10 is provided with a regulating part for regulating the air communication pipe 15 to be aligned (or nearly aligned) with the axial center of the main body 3.

The regulating part may be formed by slightly increasing the thickness of the partition 10 in the axial direction, and forming a recess part (regulating part) 10*c* in the thickened section, which accommodates a tip end of the air communication pipe 15. The recess part 10*c* may be arbitrarily formed so long as the air communication pipe 15 is axially movable with the play to a certain degree. Specifically, the micro-gap may be formed between the outer circumferential surface of the air communication pipe 15 and the inner circumferential surface of the recess part 10*c* so that the liquid can be held therebetween in the state where the air communication pipe 15 is urged against the partition 10 side. Even if the fitted state between the outer circumferential surface of the air communication pipe 15 and the inner circumferential surface of the recess part 10*c* hardly holds the liquid, such state is permissible so long as the liquid can be guided to the inside of the flow passage 10*a* upon displacement of the air communication pipe 15 to separate from the partition. Preferably, the axial length of the recess part 10*c* is longer than a stroke (to be adjusted by the urging force of the urging unit) W of the air communication pipe 15 so that the air communication pipe 15 can be stably regulated (in FIG. 1, the respective lengths are substantially the same).

The partition 10 of the embodiment includes a flow rate adjuster for adjusting the flow rate of the liquid to be supplied from the storage chamber 5 to the flow passage 10*a*. The flow rate adjuster is disposed in consideration of viscosity and type of the liquid stored in the storage chamber, appropriate quantity of the liquid to be supplied upon shaking of the main body, or the like. For example, an axially extending annular wall 10*d* that is fitted with the inner surface of the main body 3 is formed on the outer circumference of the partition 10, to which ribs (flow rate adjusters) 10*e* extending toward the circumferential wall 15*a* of the air communication pipe 15 are attached.

As FIG. 1B shows, the ribs 10*e* are formed along the longitudinal direction of the annular wall 10*d* at, for example, four points at an angular interval of approximately 90°. Each of the ribs 10*e* is formed adapted to the internal diameter of the recess part 10*c* constituting the above-described regulating part. It is possible to form the recess part 10*c*, the annular wall 10*d*, and the ribs 10*e* integrally with the partition 10. In this case, the supply quantity of the liquid to the flow passage 10*a* may be adjusted by variously changing each thickness, the number, each axial length, and each protruding height of the ribs 10*e*. In the above-described structure, like the recess part 10*c*, the ribs 10*e* extendingly formed on the annular wall 10*d* allow movement of the air communication pipe 15 to be stably regulated.

Figure 2:
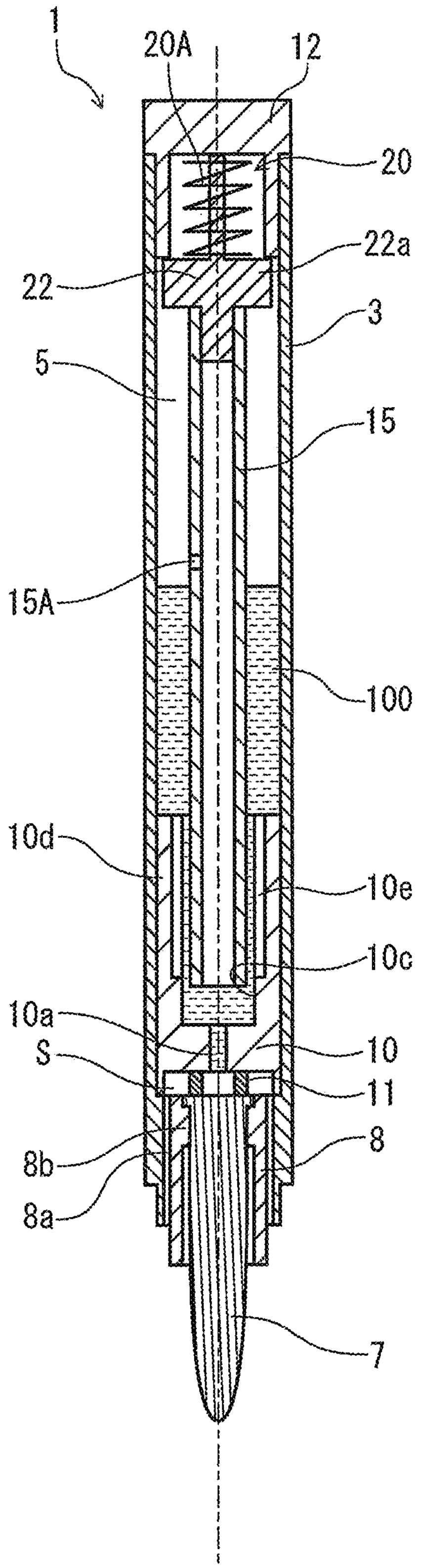
FIG. 2 is a longitudinal sectional view of the applicator as shown in FIG. 1 in the state where a flow passage of a partition is opened through movement of an air communication pipe to the rear end.

Referring to FIG. 1, the above-structured applicator 1 in the normal state allows the spring member 20A to bring the air communication pipe 15 into abutment on the partition 10. Abutment of the leading edge 15*c* of the circumferential wall 15*a* on the partition 10 closes the flow passage 10*a* formed in the partition 10. When shaking the main body 3 in this state, the spring member 20A is compressed by the weight of the stirring member 22 so that the air communication pipe 15 is separated from the partition 10. At this time, the liquid in the storage chamber 5 (liquid between the flow rate adjusters 10*e*) flows into the flow passage 10*a* from the recess part 10*c*, and directly moves to the application body 7 as shown in FIG. 2.

The storage chamber 5 is communicated with the atmosphere via the air passage 8*a* formed in the holder 8, the flow passage 10*a*, and the air port 15A of the air communication pipe 15. Upon separation of the air communication pipe 15 from the partition 10, the liquid immediately flows into the flow passage 10*a* of the partition 10, and moves toward the application body 7. In this case, despite the high-viscous liquid, the internal pressure of the storage chamber 5 is in substantially the same state as that of the atmosphere (upon detachment of the cap 13, the internal pressure of the storage chamber immediately becomes the same as the atmospheric pressure). When the air communication pipe 15 is separated from the partition 10, the liquid immediately moves toward the flow passage 10*a* by the gravity of the liquid, the water load, and shaking operation so that the application body 7 secures the stable liquid outflowing state (smooth liquid application state).

As described above, the storage chamber 5 is communicated with the atmosphere so that the liquid outflowing state is improved (good response to liquid supply). Accordingly, there is no need of shaking the main body 3 frequently. This allows the application body 7 to apply the liquid sufficiently by shaking less frequently. The use of low-viscous liquid secures sufficient outflow quantity only by shaking the main body once or twice. As described above, formation of the flow rate adjusters 10*e* allows adjustment of the outflow quantity from the flow passage 10*a*.

The air communication pipe 15 is urged against the partition 10 under the urging force of the spring member 20A. When shaking of the main body 3 is stopped, the air communication pipe 15 closes the flow passage 10*a* to prevent outflow of the liquid from the storage chamber to the application body. The unnecessary liquid outflow from the flow passage 10*a* of the partition 10 is avoided to prevent the application body side from being brought into the liquid-rich state. In the embodiment, the protrusion 22*a* of the stirring member 22 performs the stirring function. Even if the stored liquid is likely to cause compositional separation, the liquid can be mixed by shaking.

In the structure as described above, it is preferable to provide the air port 15A of the air communication pipe 15 at the position that is free from entry of the liquid to be filled in the storage chamber 5 upon change in the posture of the main body 3. In the embodiment, as FIG. 1 shows, in the case where the application body 7 is directed either downward or upward (not shown), the air port 15A is set to be positioned above the surface of the liquid 100 stored in the storage chamber 5. Although not shown, in the case where the main body 3 is laterally placed, the air port is set so that the liquid surface is below the circumferential wall 15*a* of the air communication pipe 15.

As a result, the liquid 100 in the storage chamber 5 does not infiltrate into the air port 15A irrespective of the posture of the main body 3. This may prevent the liquid outflow to the application body side through the air port 15A even if the internal pressure of the storage chamber 5 is increased.

In the case of small diameters of both the air communication pipe 15 and the air port 15A, high viscosity of the liquid to be stored, or the like, quantity of the outflowing liquid to the inside of the air communication pipe 15 becomes very small. The liquid outflowing to the inside of the air communication pipe 15 is allowed to directly flow into the application body 7 via the flow passage 10*a*.

Accordingly, it is possible to change the position where the air port 15A is formed in accordance with the liquid to be stored the diameter of the air communication pipe 15, or the like.

Figure 3:
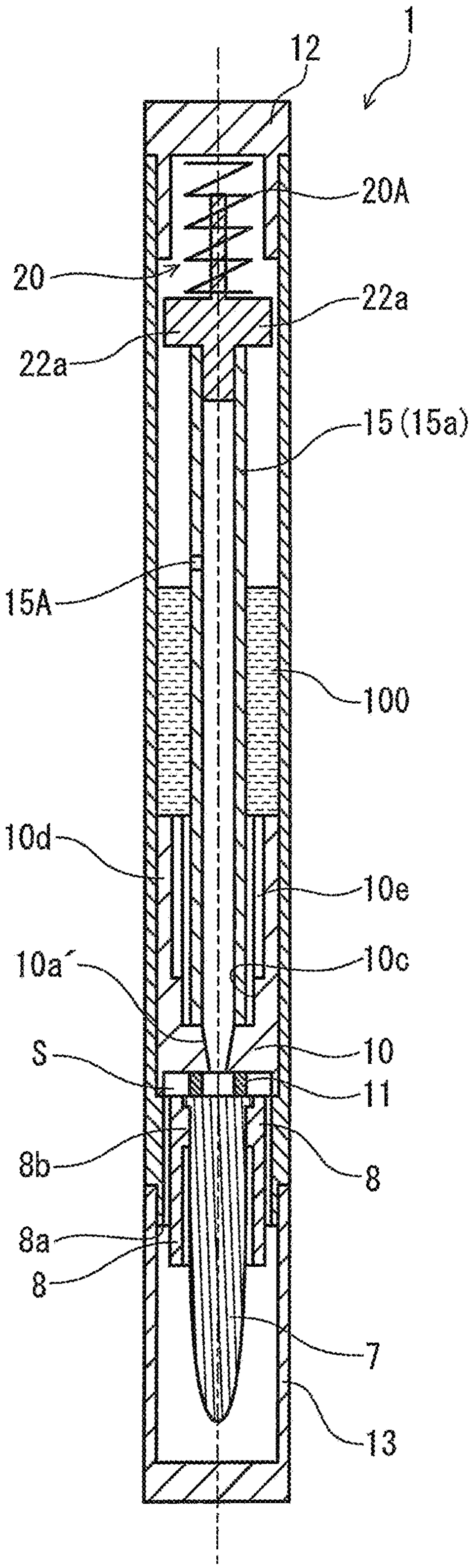
FIG. 3 is a longitudinal sectional view of the applicator according to a second embodiment of the present invention.

FIG. 3 is a longitudinal sectional view of the applicator according to a second embodiment of the present invention.

In the embodiment to be described herein, the similar components to those shown in FIG. 1 will be designated with the same reference codes, and explanations thereof, thus will be omitted.

In the embodiment, a flow passage 10a' formed in the partition 10 has its diameter gradually increased toward the tail plug side. An opening diameter of the flow passage 10a' is substantially the same as the internal diameter of the air communication pipe 15 so that the liquid can easily flow to the flow passage 10a'. This structure secures large inflow quantity of the liquid to the flow passage 10a' upon separation of the air communication pipe 15 from the partition 10. Storage of the high-viscous liquid may improve the liquid discharge sensitivity.

Figure 4:
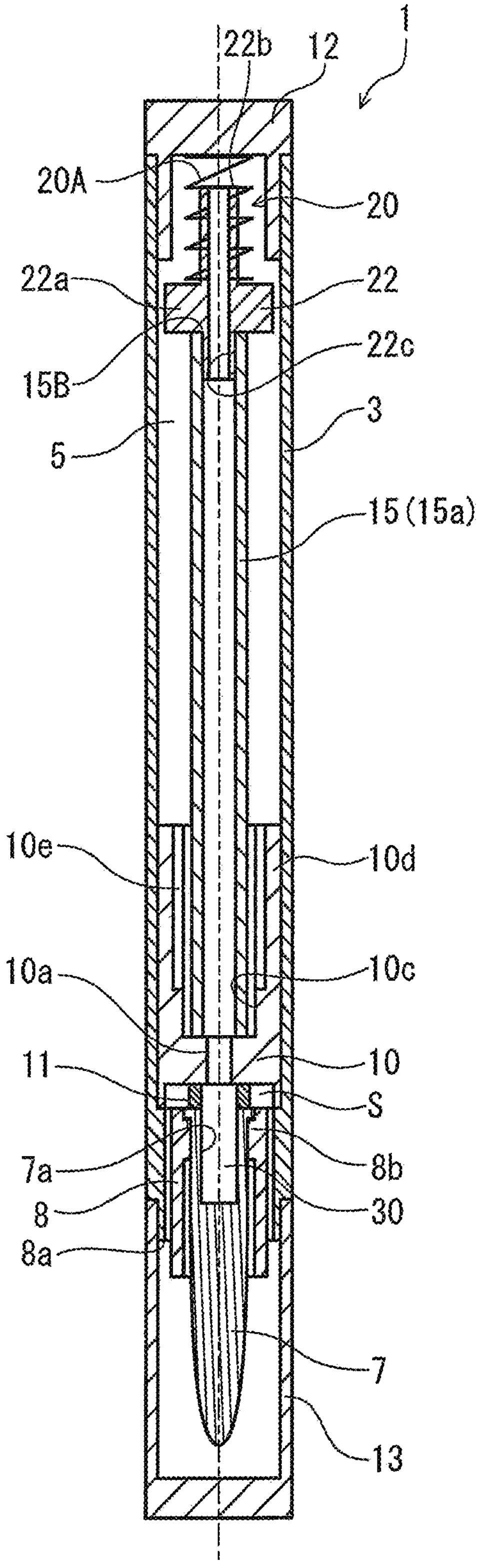
FIG. 4 is a longitudinal sectional view of the applicator according to a third embodiment of the present invention.

FIG. 4 is a longitudinal sectional view of the applicator according to a third embodiment of the present invention.

In this embodiment, an opening (air port) open to the storage chamber is formed in the stirring member 22 press fitted to a rear end opening 15B instead of forming the air port in the circumferential wall 15a of the air communication pipe 15. In other words, an air port 22b is formed in a rear end of the stirring member 22 press fitted to the opening 15B of the air communication pipe 15. A through hole 22c is also formed in the stirring member 22 while penetrating therethrough in the axial direction. Air in the air communication pipe 15 is discharged to the inside of the storage chamber 5 via the through hole 22c and the air port 22b of the stirring member 22.

It is possible to variously change the structure and position of the air port for discharging air in the air communication pipe 15 into the storage chamber 5, and further the air discharging path or the like.

In the structure as described above, it is preferable to form the air port 22b to prevent inflow of the liquid filled in the storage chamber 5 upon change in the posture of the main body 3.

As the drawing shows, a reservoir chamber 30 may be provided to the application body side seen from the partition 10 for storing the liquid outflowing from the flow passage 10a. The reservoir chamber 30 as shown in the drawing is provided by forming a recess part 7a in the application body 7. Otherwise, the reservoir chamber may be formed between the partition 10 and the application body 7 having its length shortened.

Even if a large quantity of liquid outflows from the flow passage 10a as a result of excessive shaking of the main body 3, the reservoir chamber 30 allows storage of the surplus liquid. This allows continuous application, and also immediate application upon detachment of the cap 13 without shaking the main body 3.

To form the reservoir chamber 30, an occluding body for occluding the liquid may be disposed in the reservoir chamber. The occluding body is made of a material with weaker capillary force than the application body 7 so that the liquid outflowing from the flow passage 10a can be temporarily occluded. Upon consumption of the liquid through application by the application body 7, the occluded liquid can be consumed. This makes it possible to suppress the application body 7 from being brought into the liquid-rich state.

Figure 5:
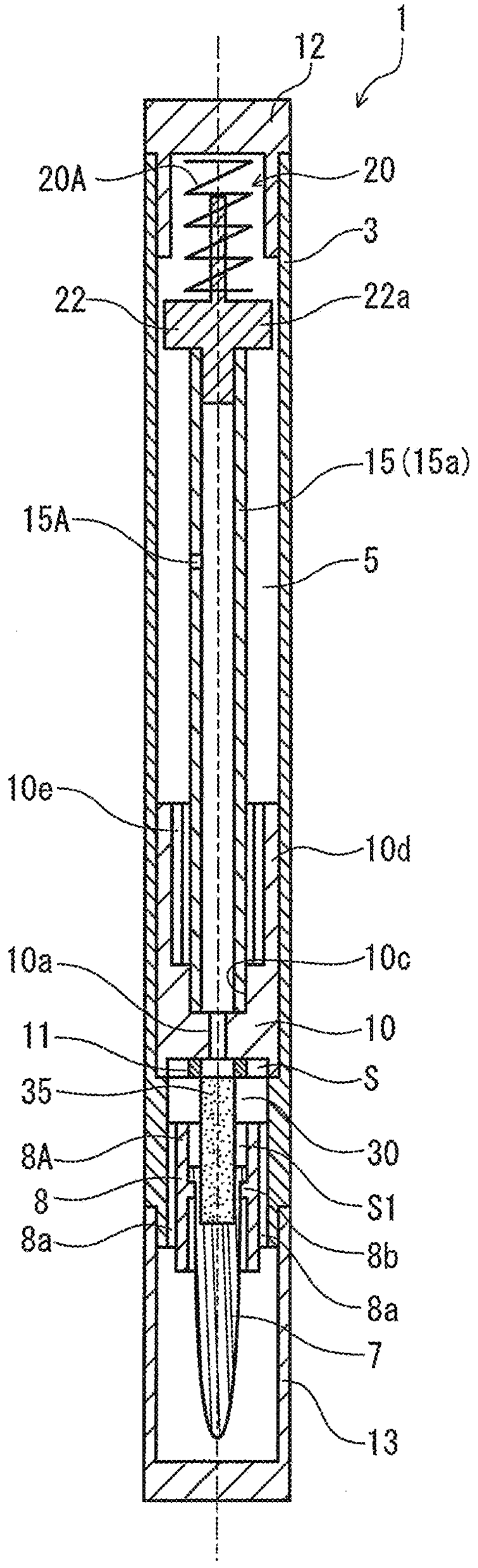
FIG. 5 is a longitudinal sectional view of the applicator according to a fourth embodiment of the present invention.

FIG. 5 is a longitudinal sectional view of the applicator according to a fourth embodiment of the present invention.

In the embodiment, the liquid outflowing from the flow passage 10a of the partition 10 is not directly supplied to the application body 7. Instead, the reservoir chamber 30 is formed between the partition 10 and the application body 7, at which a relay member 35 is disposed for liquid transfer so that the liquid is guided to the application body 7 via the relay member 35.

The material for forming the relay member 35 is not specifically limited so long as the relay member 35 performs the function for transferring the liquid to the application body 7. If the liquid outflows excessively from the flow passage 10a, the surplus liquid is stored in the reservoir chamber 30. Upon consumption of the liquid for application by the application body side, the stored liquid may be transferred to the application body via the relay member 35 (the liquid can be supplied to the application body without requiring frequent shaking of the main body).

Alternatively, in addition to the liquid transfer function, the temporary liquid storage function may be imparted to the relay member 35. For example, it may be formed as a porous bar-like member by bundling many fibers parallel to the axial direction in the compressional state. The resultant structure serves to transfer the inflowing liquid from the flow passage 10a to the application body 7 under the capillary force. If there is no inflowing liquid from the flow passage 10a, the liquid can be stored. In the structure provided with the reservoir chamber 30, the capillary force of the fibrous relay member is capable of transferring the liquid stored in the reservoir chamber to the application body side.

The relay member 35 may be arbitrarily formed so long as it is structured to sensitively transfer the liquid outflowing from the flow passage 10a, or the liquid stored in the reservoir chamber 30 to the application body 7. The porosity of the member is appropriately selected in accordance with viscosity of the liquid stored in the storage chamber. For example, in the case of the low-viscous liquid, it is preferable to employ the member with low porosity. In the case of the high-viscous liquid, it is preferable to employ the member with high porosity.

A storage part S1 may be formed around the relay member 35 to store the liquid overflowing out of the relay member 35. The storage part S1 can be formed as the gap between the inner surface of a main body 8A of the holder 8 and the outer surface of the relay member. The storage part S1 allows the region provided with the relay member 35 to be filled with the liquid to protect the application body 7 from being dried. In other words, the application body 7 can be kept in a wet state so that the application can be performed immediately after detachment of the cap 13. This also allows the application body to continuously perform application without requiring frequent shaking of the main body 3.

The relay member 35 is not limited to the fibrous structure. For example, the molded article such as a plastic product can be used to hold the liquid under the capillary force along the axial direction.

Figure 6:
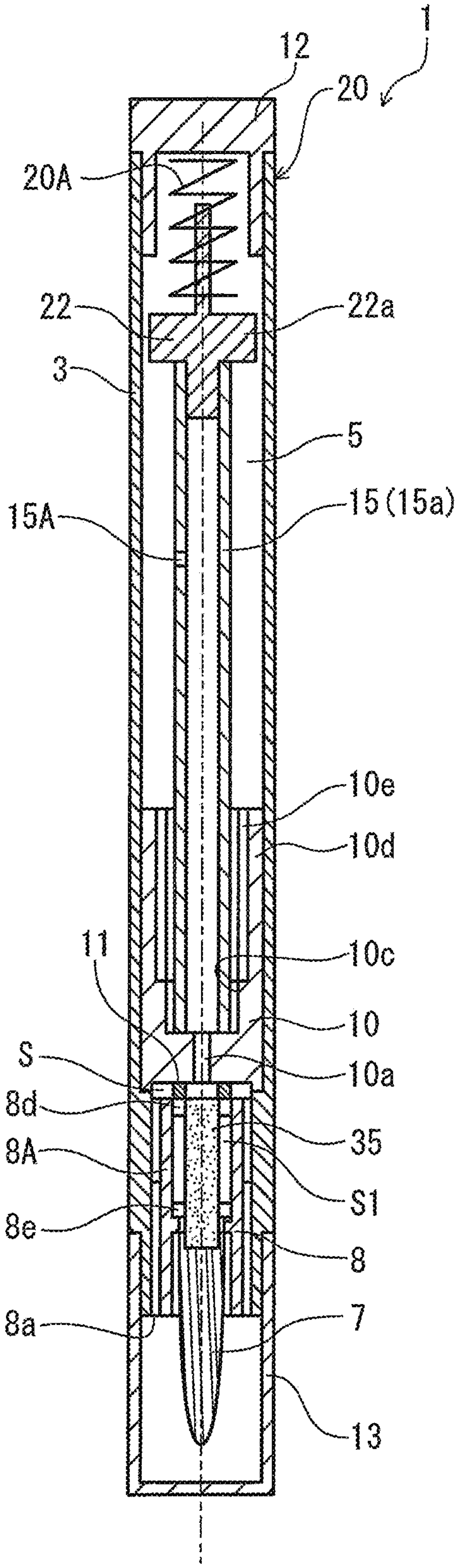
FIG. 6 is a longitudinal sectional view of the applicator according to a fifth embodiment of the present invention.

FIG. 6 is a longitudinal sectional view of the applicator according to a fifth embodiment of the present invention.

In the embodiment, the reservoir chamber as described above is not formed. Instead, the relay member 35 is held with the holder 8. The main body 8A of the holder 8 has a cylindrical shape, and extends in the axial direction, in which the integrally formed application body 7 and the relay member 35 are held.

Openings 8d, 8e each having a polygonal cross section are formed at top and bottom ends of the main body 8A of the holder 8, respectively. The relay member 35 having a circular cross section is inserted through the openings, and held therein. The gap (storage part) S1 is formed between the relay member 35 and the main body 8A, in which the liquid outflowing from the flow passage 10*a* is held (serving as a liquid sump).

The structure stabilizes the holding state of the relay member 35, and facilitates stable formation of the gap S1 around the relay member.

Figure 7:
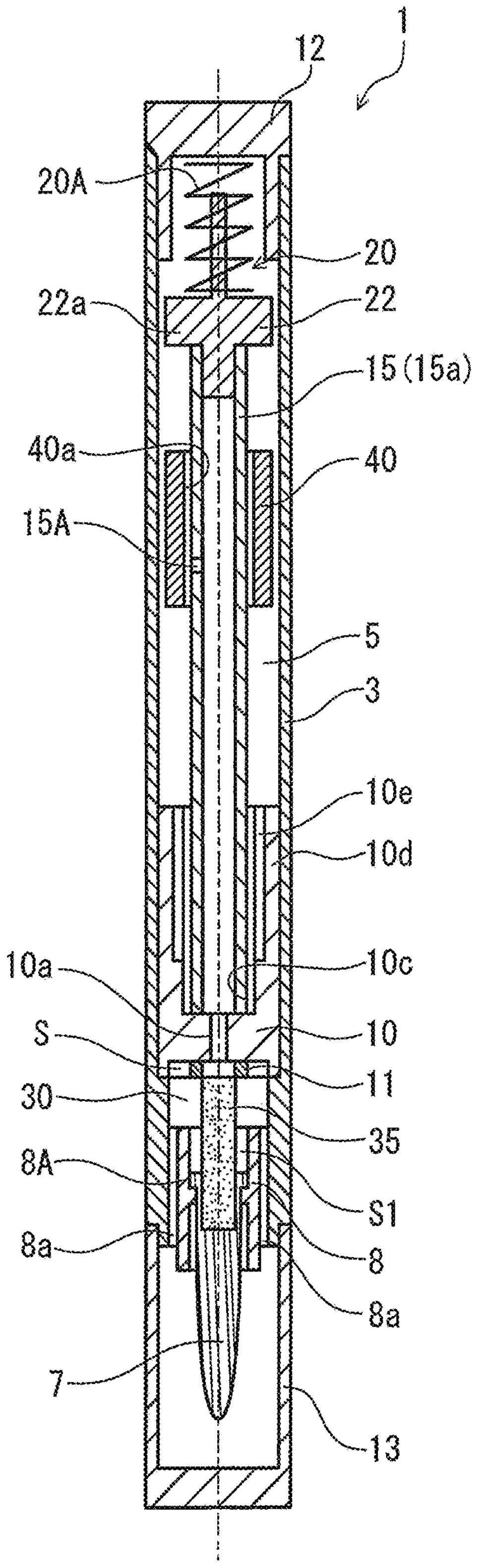
FIG. 7 is a longitudinal sectional view of the applicator according to a sixth embodiment of the present invention.

FIG. 7 is a longitudinal sectional view of the applicator according to a sixth embodiment of the present invention.

In this embodiment, an axially movable mass 40 for stirring the liquid is disposed in the storage chamber 5. The mass 40 has an axially penetrating through hole 40*a* in the center for accommodating insertion of the air communication pipe 15.

The mass 40 can be brought into abutment on the protrusion 22*a* of the stirring member 22. As the mass 40 can be brought into abutment on the protrusion 22*a* of the stirring member 22 by shaking the main body 3, the air communication pipe 15 is made easily movable against the urging force of the spring member 20A. The mass 40 axially displaces in the storage chamber to perform the liquid stirring function. This makes it possible to stir the pigment-based liquid efficiently.

Figure 8:
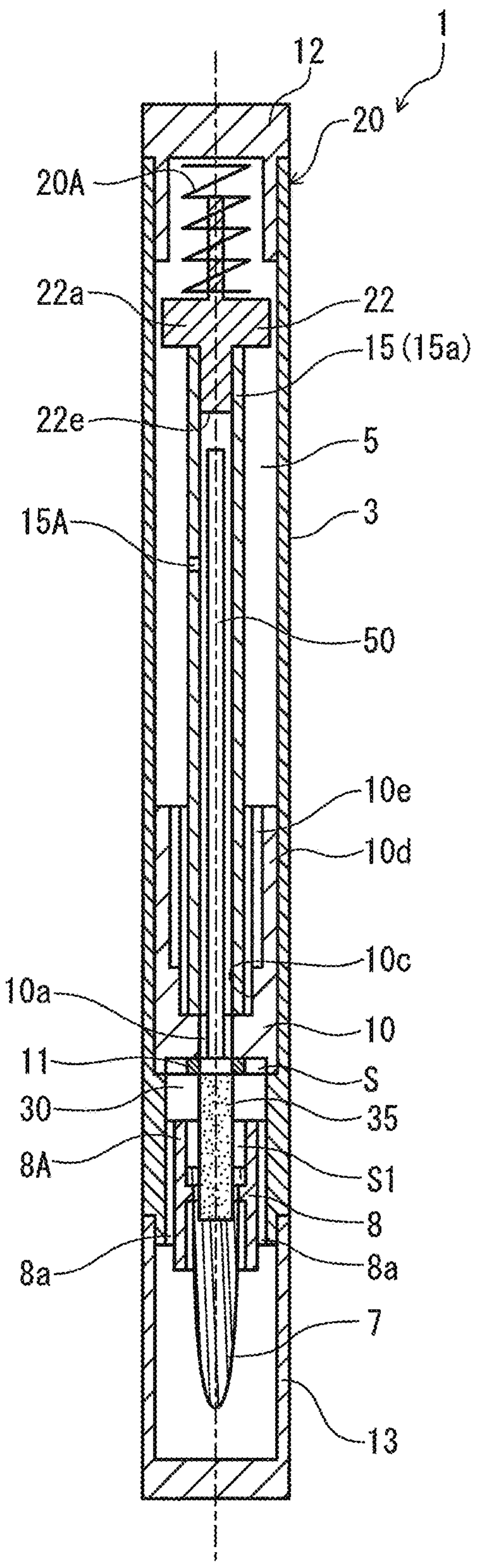
FIG. 8 is a longitudinal sectional view of the applicator according to a seventh embodiment of the present invention.

FIG. 8 is a longitudinal sectional view of the applicator according to a seventh embodiment of the present invention.

In this embodiment, an axially extending rod-like member 50 is disposed in the air communication pipe 15.

The rod-like member 50 is provided with a specific weight and, when the main body 3 is shaken, abuts on an inner surface 22*e* of the stirring member 22 to make the air communication pipe 15 easily movable against the urging force of the urging unit. As the liquid resistance does not act on such member, it can drop earlier than the air communication pipe 15. This makes it possible to guide the liquid in the storage chamber 5 (liquid in the flow rate adjuster 10*e*) to the flow passage 10*a*. In other words, movement of the rod-like member 50 within the air communication pipe effectively prevents the liquid from being clogged and dried around the flow passage.

The rod-like member 50 may be brought into abutment on the relay member 35 (application body 7) via the flow passage 10*a* of the partition 10.

The structure as described above allows the rod-like member 50 to perform the function of the relay member, and the liquid to be smoothly supplied to the application body.

Figure 9:
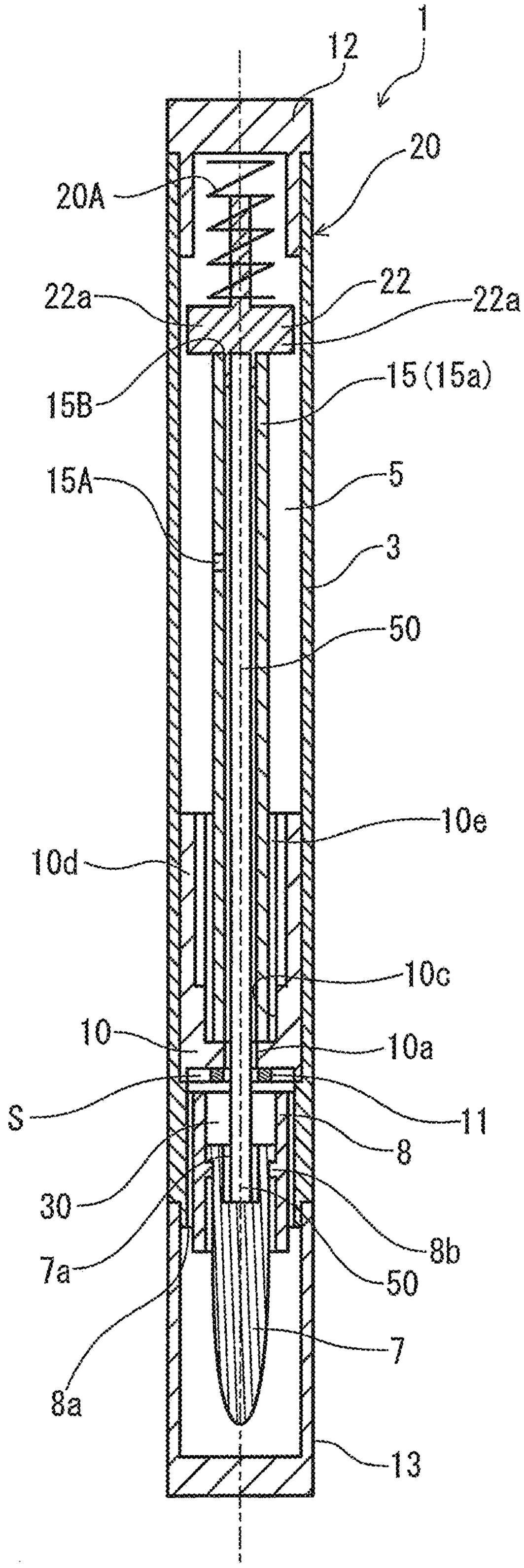
FIG. 9 is a longitudinal sectional view of the applicator according to an eighth embodiment of the present invention.

FIG. 9 is a longitudinal sectional view of the applicator according to an eighth embodiment of the present invention.

In this embodiment, a rear end of the rod-like member 50 as shown in FIG. 8 is fitted with the stirring member 22 to integrally operate the air communication pipe 15 and the rod-like member 50 in association with each other. A tip end side of the rod-like member 50 is brought into contact with the application body 7 under the urging force of the spring member 20A via the flow passage 10*a*, the reservoir chamber 30 and the recess part 7*a* formed in the application body 7.

This structure allows the liquid accumulated in the reservoir chamber 30 and the recess part 7*a*, or the like to be efficiently supplied to the application body 7. The rod-like member 50 is in contact with the application body 7 constantly under the urging force of the spring member 20A. The use of the liquid holding material for forming the rod-like member 50 protects the application body 7 from being dried.

Figure 10:
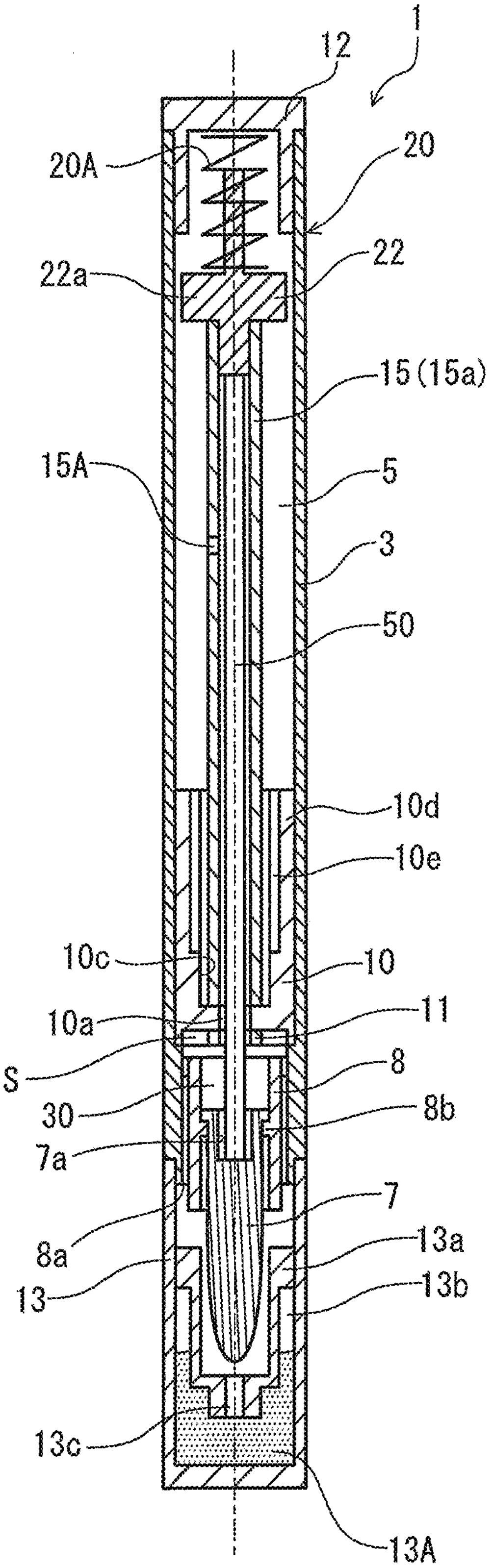
FIG. 10 is a longitudinal sectional view of the applicator according to a ninth embodiment of the present invention.

FIG. 10 is a longitudinal sectional view of the applicator according to a ninth embodiment of the present invention.

In this embodiment, a partition 13*a* is formed in the cap 13 to have a storage chamber 13*b* therein so that the storage chamber 13*b* is filled with a solvent 13A. The solvent 13A in the storage chamber can be brought into contact with the application body 7 via a through hole 13*c* formed in the partition 13*a* to protect the application body 7 from being dried.

FIG. 11 shows the applicator according to a tenth embodiment of the present invention. FIG. 11A is a longitudinal sectional view, and FIG. 11B is a sectional view taken along line C-C of FIG. 11A.

In this embodiment, a relay member 10*f* is inserted and fixed to the inside of the flow passage 10*a* of the partition 10 for adjusting the outflow quantity of the liquid flowing to the application body side. The relay member 10*f* of the embodiment has one end entering the air communication pipe 15 while having a given space therefrom, and the other end in contact with the application body 7. The relay member 10*f* disposed in the flow passage 10*a* allows adjustment of the outflow quantity (outflow rate) of the liquid flowing to the application body 7 side when the air communication pipe 15 is separated from the partition 10 upon shaking, or the like.

The relay member 10*f* may be formed as a bundled fiber body. The flow passage 10*a* of the partition 10 has a polygonal cross section for accommodating insertion of the relay member 10*f* having a circular cross section so that the relay member 10*f* is positioned and fixed. The gap between the inner surface of the flow passage and the outer surface of the relay member 10*f* may be formed as the adjustment flow passage 10*a*". The structure allows the liquid to flow in the relay member 10*f*, and allows the gap to serve as an air replacement part (air passage) to supply the liquid to the application body 7 by adjusting the outflow quantity. In this case, the outer circumference of the relay member 10*f* may come in contact with the inner surface of the flow passage 10*a* of the partition at two or more points. The flow passage 10*a* may be appropriately modified to have an elliptical cross section, for example.

Figure 11A:
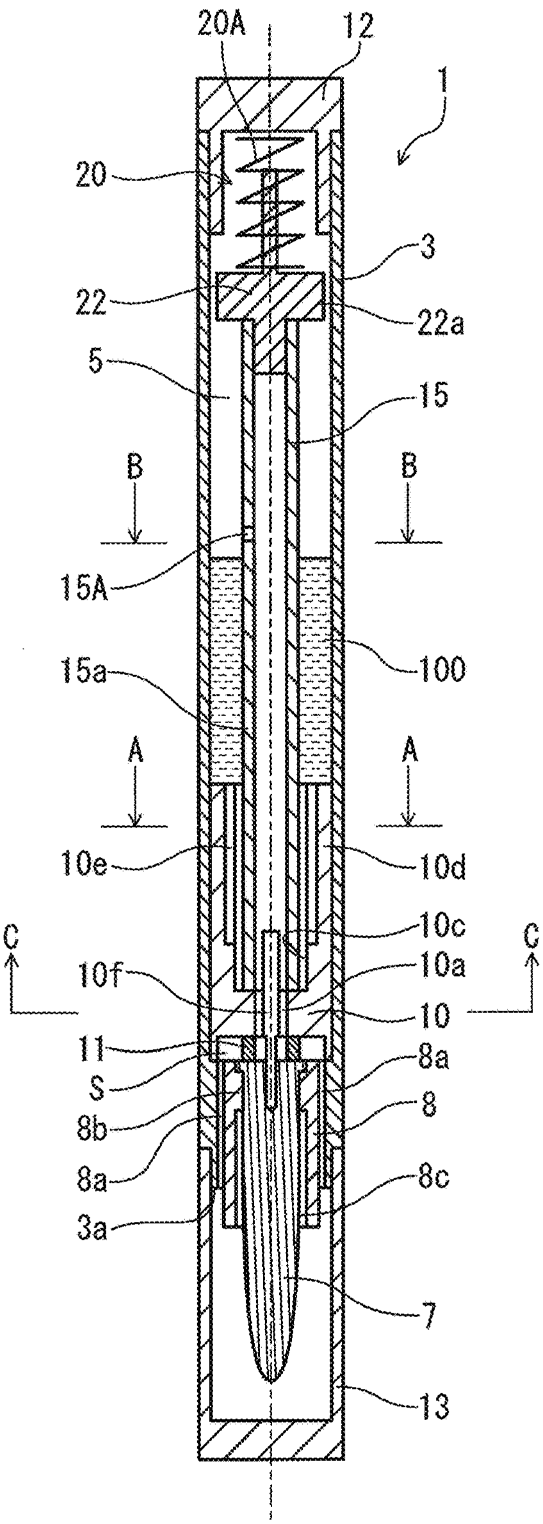
FIG. 11A is a longitudinal sectional view.
Figure 11B:
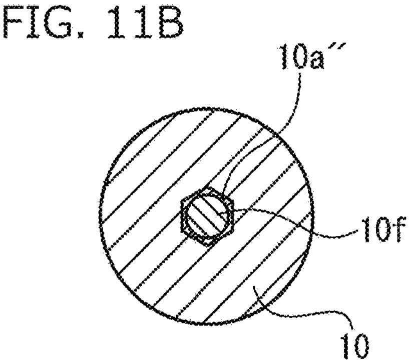
FIG. 11B is a sectional view taken along line C-C of FIG. 11A.
Figure 11C:
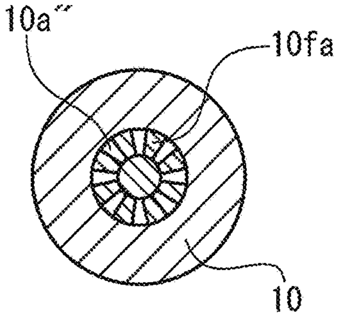
FIG. 11C shows a first modified example of a relay member shown in FIG. 11A.
Figure 11D:
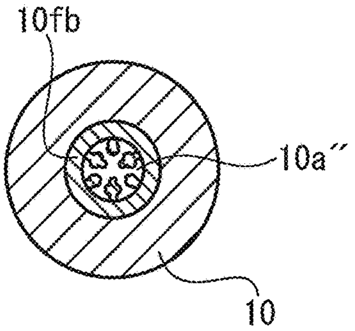
FIG. 11D shows a second modified example of the relay member shown in FIG. 11A.
Figure 11E:
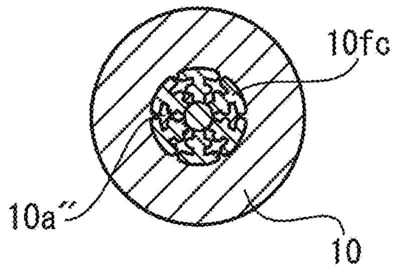
FIG. 11E shows a third modified example of the relay member shown in FIG. 11A.

FIG. 11C to 11E illustrate modified examples of the relay member as shown in FIG. 11A.

The relay member may be formed as a plastic molded product such as polyacetal (POM) besides the bundled fiber body. Each of the plastic relay members 10*fa*, 10*fb*, 10*fc* as shown in the drawings is fitted with the inside of the flow passage 10*a* of the partition 10, and provided with the adjustment flow passage 10*a*" including a higher capillary force section and a lower capillary force section along the axial direction. In other words, air flows to the lower capillary force section, and the liquid flows to the higher capillary force section so that the outflow quantity (outflow rate) of the liquid supplied to the application body 7 is adjusted.

As described above, the relation between the inner surface of the flow passage 10*a* of the partition 10 and the relay member is not specifically limited. The relation may be implemented by forming the air passage inside the relay member, or forming the gap in the outer surface region. The relay member does not have to constantly hold the liquid therein. The liquid required by the application body 7 may be of arbitrary type so long as it can be supplied to the relay member and the application body through a tip end of the storage chamber 5, which is opened by shaking. Each length of the relay members 10*f*, 10*fa*, 10*fb*, 10*fc* may extend over an entire axial length of the flow passage 10*a* of the partition 10, or extend partially in the axial direction. Alternatively, one end of each of the relay members may extend to the rear end of the inside of the air communication pipe 15, and the other end may extend to the inside of the application body 7. Furthermore, the other end of each of the relay members may be just in contact with the application body 7, or may be separated from the application body 7. The structure for inserting the relay member into the air communication pipe 15 is not limited so long as such member is not fitted with the air communication pipe 15 to prevent an air port 15A from being blocked.

Figure 12A:
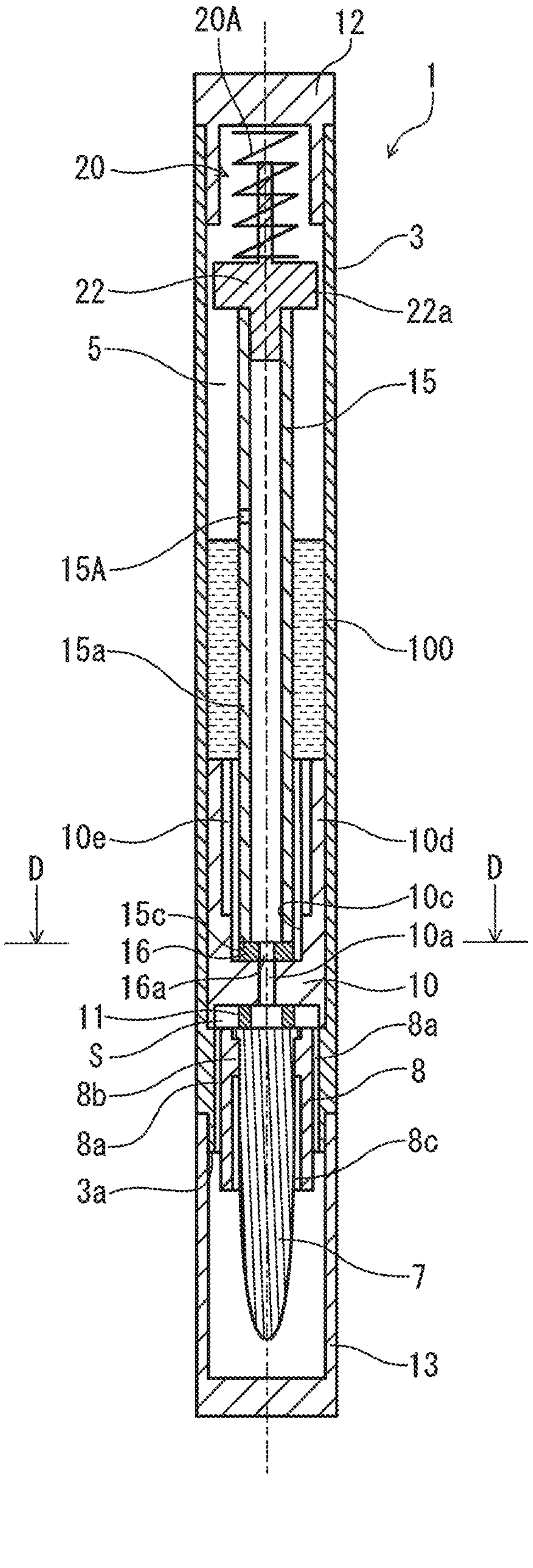
FIG. 12A is a longitudinal sectional view.
Figure 12B:
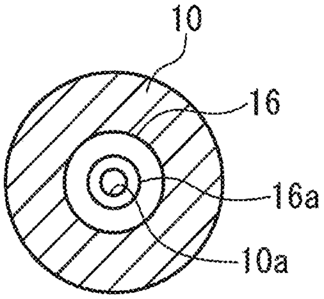
FIG. 12B is a sectional view taken along line D-D of FIG. 12A.

FIG. 12 shows a modified example of the above-described first embodiment. FIG. 12A is a longitudinal sectional view, and FIG. 12B is a sectional view taken along line D-D of FIG. 12A.

In the structure as shown in FIG. 1, the leading edge 15*c* of the air communication pipe 15 is directly brought into abutment on the partition 10 to seal the flow passage 10*a*. A seal material 16 may be provided to intervene between the leading edge 15*c* and the partition 10 as an auxiliary member for imparting sealability. Preferably, the seal material 16 is made of a flexible material. For example, such material as silicon, rubber, and cotton may be used for forming a plate-like shape. A communication hole 16*a* with the diameter larger than that of the flow passage 10*a* is formed in the center of the seal material 16. The seal material is disposed between the air communication pipe 15 and the partition 10 to improve tight contactness when the air communication pipe 15 is pressed by the urging unit, resulting in improved sealability.

The embodiments of the present invention have been described. The present invention is not limited to those embodiments, but may be variously modified.

The present invention is characterized in that the air communication pipe 15 is urged against the partition to close the flow passage 10*a* therein, air is communicated with the inside of the storage chamber 5 via the air communication pipe 15, and the air communication pipe 15 is separated from the partition to allow the liquid in the storage chamber to outflow from the flow passage 10*a* by shaking the main body 3. It is possible to appropriately modify structures of the application body 7 and the partition 10, and the path through which air passes to reach the air communication pipe 15 from outside.

It is also possible to appropriately modify the size (capacity) of the storage chamber 5, the thickness, length, the stroke of the air communication pipe 15, or the like in accordance with usage of the applicator (viscosity of the liquid to be stored, and the capacity).

The embodiments may be implemented by replacing the component of one embodiment with that of the other embodiment, or combining the components. In the embodiments, the cosmetic tool such as the eyeliner has been described as an exemplified case. However, the present invention is applicable to various applicators such as the writing tool. Accordingly, the shape and the axial length of the main body, and structure of the application body may be appropriately modified.

What is claimed is:

1. An applicator comprising:
- a main body;
- a storage chamber disposed in the main body for storing a liquid;
- an application body disposed at an end of the main body to allow application of the liquid stored in the storage chamber;
- a partition for partitioning between the storage chamber side and the application body side, the partition including a flow passage to supply the liquid in the storage chamber to the application body;
- an axially movable air communication pipe having an air port open to the storage chamber, the axially movable air communication pipe abutting on the partition to close the flow passage and communicating the storage chamber with the atmosphere while having the flow passage closed; and
- an urging unit for urging the air communication pipe to abut on the partition, and separating the air communication pipe from the partition through vibration of the main body to allow guiding of the liquid in the storage chamber to the flow passage.

2. The applicator according to claim 1, wherein when the air communication pipe is urged by the urging unit, a leading edge of the air communication pipe is brought into abutment on the partition to close the flow passage.

3. The applicator according to claim 2, wherein a seal material intervenes between the air communication pipe and the partition.

4. The applicator according to claim 1, wherein the air communication pipe is communicated with the atmosphere via the flow passage.

5. The applicator according to claim 1, wherein the urging unit is a spring member disposed between the main body and the air communication pipe.

6. The applicator according to claim 5, wherein:
- a stirring member is press fitted to a rear end of the air communication pipe; and
- the spring member intervenes between the main body and the stirring member.

7. The applicator according to claim 6, wherein:
- the stirring member includes an opening open to the storage chamber; and
- the opening of the stirring member press fitted to the rear end of the air communication pipe serves as the air port.

8. The applicator according to claim 1, wherein:
- an axially movable mass for stirring the liquid is disposed in the storage chamber; and
- the air communication pipe is inserted through the mass for stirring the liquid.

9. The applicator according to claim 1, wherein the air port of the air communication pipe is disposed at a position free from entry of the liquid to be filled in the storage chamber upon change in a posture of the main body.

10. The applicator according to claim 1, wherein the partition has a regulating part for regulating the air communication pipe to be aligned with an axial center direction of the main body.

11. The applicator according to claim 1, wherein:
- the partition includes an axially extending annular wall which is fitted with an inner surface of the main body; and
- the annular wall includes a flow rate adjuster which protrudes toward an outer circumferential surface of the air communication pipe to adjust a flow rate of the liquid supplied from the storage chamber to the flow passage.

12. The applicator according to claim 1, wherein:
- the application body is held with a holder integrated with the main body;
- the holder includes an air passage communicated with the atmosphere; and
- the application body is held with the holder while leaving a gap intervening between the application body and the partition.

13. The applicator according to claim 1, wherein a reservoir chamber is provided to the application body side seen from the partition for storing the liquid outflowing from the flow passage of the partition.

14. The applicator according to claim 1, wherein a relay member is disposed between the flow passage of the partition and the application body for guiding the liquid outflowing from the flow passage to the application body.

15. The applicator according to claim 14, wherein the relay member is made of a material capable of temporarily holding the liquid.

16. The applicator according to claim 14, wherein a storage part capable of storing the liquid is disposed around the relay member.

17. The applicator according to claim 1, wherein an axially extending rod-like member is disposed in the air communication pipe.

18. The applicator according to claim 17, wherein the rod-like member passes through the flow passage of the partition, and is abuttable on the application body or the relay member.

19. The applicator according to claim 1, wherein a relay member is disposed in the flow passage of the partition for adjusting an outflow quantity of the liquid flowing to a side of the application body.

20. The applicator according to claim 19, wherein the relay member is formed as a plastic molded product which is fitted with the inside of the flow passage of the partition, and has a higher capillary force section and a lower capillary force section along an axial direction.

* * * * *